A. L. McMURTRY.
AUTOMOBILE LIGHT.
APPLICATION FILED AUG. 31, 1912.

1,105,035.

Patented July 28, 1914.

WITNESSES

INVENTOR
Alden L. McMurtry
BY
E. W. Marshall
ATTORNEY

UNITED STATES PATENT OFFICE.

ALDEN L. McMURTRY, OF SOUND BEACH, CONNECTICUT.

AUTOMOBILE-LIGHT.

1,105,035.   Specification of Letters Patent.   Patented July 28, 1914.

Application filed August 31, 1912. Serial No. 718,004.

*To all whom it may concern:*

Be it known that I, ALDEN L. McMURTRY, a citizen of the United States, and a resident of Sound Beach, county of Fairfield, State of Connecticut, have invented certain new and useful Improvements in Automobile-Lights, of which the following is a specification.

My invention relates to means for illuminating the path of a vehicle and it has special reference to the control of search lights or lamps which are adapted for use with automobiles, cars, or other reversible motor vehicles.

The object of my invention is to provide a lamp of the character above indicated that shall not only be controlled by the operator of the vehicle with which it is associated but be automatically dependent upon the position of the vehicle reversing mechanism.

Automobiles and like vehicles which usually operate in a forward direction have hitherto been provided with a danger signal of some kind, such as red light at the rear, for warning following vehicles. It is however frequently necessary to operate for greater or less distance in a reverse direction and in such cases it is highly desirable to illumine the path in order to enable the chauffeur or driver to avoid dangerous irregularities or obstacles in the way.

According to my invention I provide a search light or other illuminating device which is not intended and does not replace the usual rear end signals but which throws a powerful light to the rear only when the transmission lever or other reversing control handle is thrown to reverse position. The rear search light is also dependent upon the switch that controls the other vehicle lamps and consequently is not lighted except when illumination is necessary.

Figure 1:
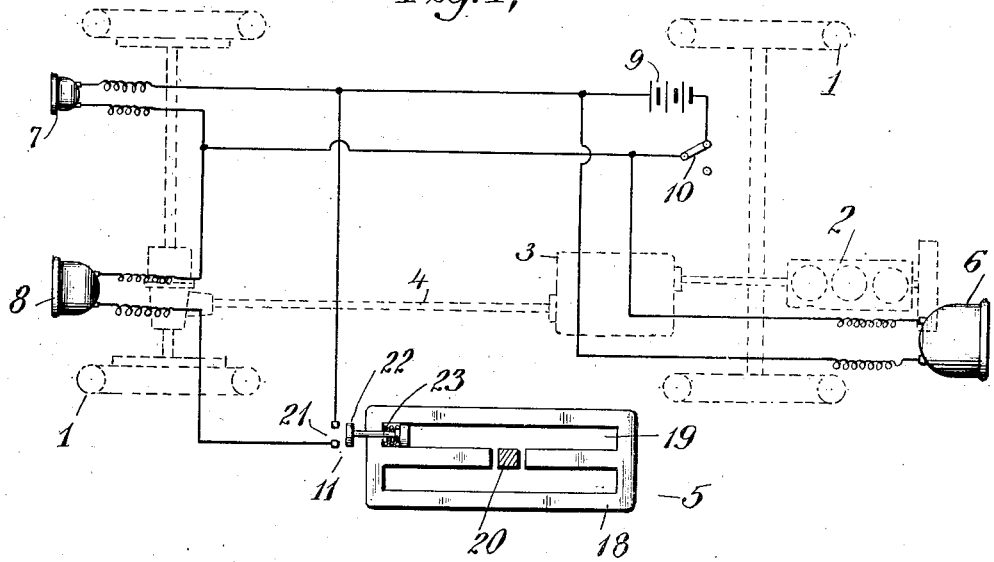
Figure 2:
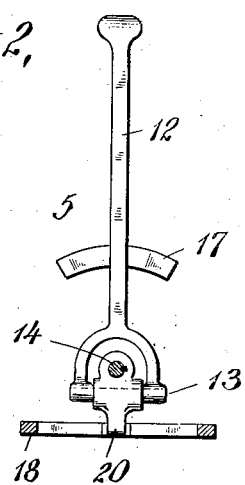
Figure 3:
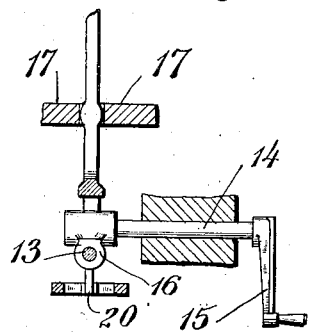
Figure 4:
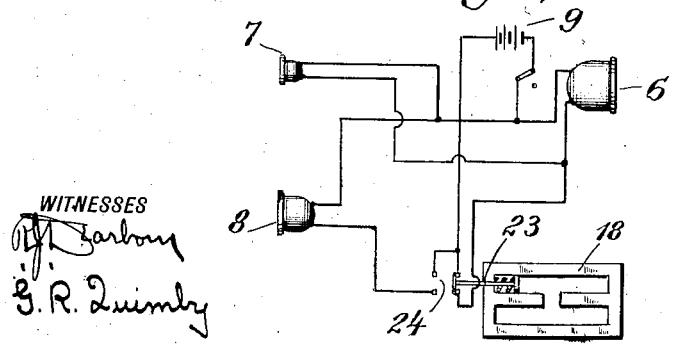

Figure 1 of the accompanying drawings is a diagrammatic view of a vehicle lighting system embodying my invention, the vehicle runing gear being shown in outline. Figs. 2 and 3 are partial elevations at right angles to each other of the transmission control mechanism of the vehicle of Fig. 1. Fig. 4 is a view corresponding to Fig. 1 of a modified arrangement which also embodies my invention.

Referring to Figs. 1, 2 and 3 of the drawings, the vehicle here shown comprises wheels 1, a motor 2, a transmission gear mechanism 3, a driving shaft 4 and a transmission gear controller 5.

My invention is not limited to any type or structure of vehicle and the above named members are intended to be representative of any well known vehicle parts.

The vehicle is equipped with one or more headlights or lamps 6 which direct light ahead, a tail light or signal 7 and a searchlight 8 which is adapted to direct its light on the path to the rear under predetermined conditions as hereinafter pointed out. The lamps are of any suitable style or kind and may be supplied with energy from a storage battery 9, or other suitable source, their circuit connections being governed by a switch 10. The lamp 8, which I shall hereinafter refer to as the "rear search light", may of course be mounted in any suitable position on the vehicle. Its circuit is not only dependent upon the switch 10 which is opened and closed by the chauffeur, but also upon a switch 11 which is closed only when the transmission controller occupies its reverse position.

The transmission controller comprises a lever 12 which is bifurcated at its lower end and supports a pin 13, a shaft 14 having an arm 15 at its inner end, and a member 16 which is secured to the shaft and is rotatively mounted on the pin 13. The lever 12 is limited in its movements by stationary guide members 17 and 18, the member 18 being provided with a slot 19 of H-shape which is engaged by a projection 20 of the forging 16.

The arrangement of parts is such that the arm 15 engages different parts of the transmission gear when the shaft 14 is adjusted longitudinally by a lateral movement of the lever 12, and actuates said parts when the shaft is rotatively adjusted by forward and backward movements of the lever. Inasmuch as transmission gears, mechanisms and controllers of this type are well known, I have not illustrated or described them in detail.

The switch 11 may be of any suitable form and comprises as shown stationary contact members 21 and a coöperating movable contact member 22 which is secured to a spring pressed pin 23. The pin extends through one end of the guide member 18 into one branch 24 of the slot 19 and is so actuated by the projection 20 in opposition to the spring as to close the switch 11 when the transmission gear controller occupies its vehicle reverse position.

Assuming that the switch 10 is closed and the headlights and tail signal in operation, if the transmission controller is thrown into its vehicle reverse position the projection 20 will close the switch 11 and the rear search-light will be energized. It will be observed that in daylight when the switch 10 is open the switch 11 may be closed without affecting the rear search-light and consequently no energy is wasted although the light is directed in the rear when most needed.

The system of Fig. 4 differs from that of Fig. 1 only in that a double throw switch 24 is substituted for the switch 11, the arrangement being such that the circuits for the lamps 6 and 7 are completed except when the transmission controller occupies its vehicle reverse position. By this means the head lamp and rear signal lamp are deënergized when the rear search-light is operating and the light is concentrated where it is most needed.

The terms forward and rear are of course relative and my invention may be used with a car or truck which is adapted to operate in either direction for indefinite periods. I desire therefore that only such limitations be imposed as are indicated in the appended claims.

What I claim is:

1. In a motor vehicle, a reversing mechanism, a control lever therefor, adapted to occupy a plurality of vehicle forward positions and a vehicle reverse position, a headlight, a rear search-light, and means dependent upon the control lever for supplying energy to the one or the other of the lights, according as the control lever occupies its vehicle forward or its vehicle reverse positions.

2. In a motor vehicle, a reversing mechanism, a control lever therefor, adapted to occupy a plurality of vehicle forward positions and a vehicle reverse position, a tail lamp, a manually operated switch for said lamp, a headlight, a rear search-light, and means controlled by said switch and dependent upon the control lever for supplying energy to either the head light or the rear search light, according as the control lever occupies its vehicle forward or its vehicle reverse positions.

In witness whereof, I have hereunto set my hand this 30th day of August 1912.

ALDEN L. McMURTRY.

Witnesses:
G. R. QUIMBY,
ERNEST W. MARSHALL.